(12) United States Patent
Casperson (10) Patent No.: US 10,095,781 B2
(45) Date of Patent: Oct. 9, 2018

(54) REUSE OF DOCUMENTATION COMPONENTS WHEN MIGRATING INTO A CONTENT MANAGEMENT SYSTEM

(71) Applicant: Red Hat, Inc., Raleigh, NC (US)

(72) Inventor: Matthew John Casperson, Brisbane (AU)

(73) Assignee: Red Hat, Inc., Raleigh, NC (US)

( * ) Notice: Subject to any disclaimer, the term of this patent is extended or adjusted under 35 U.S.C. 154(b) by 718 days.

(21) Appl. No.: 14/504,144

(22) Filed: Oct. 1, 2014

(65) Prior Publication Data

US 2016/0098399 A1   Apr. 7, 2016

(51) Int. Cl.
*G06F 7/00* (2006.01)
*G06F 17/30* (2006.01)

(52) U.S. Cl.
CPC ................. *G06F 17/3071* (2013.01)

(58) Field of Classification Search
None
See application file for complete search history.

(56) References Cited

U.S. PATENT DOCUMENTS

| | | | |
|---|---|---|---|
| 6,321,226 B1 * | 11/2001 | Garber | G06F 17/30675 |
| 6,356,903 B1 | 3/2002 | Baxter et al. | |
| 7,290,205 B2 | 10/2007 | Moncsko et al. | |
| 7,792,857 B1 | 9/2010 | Brette et al. | |
| 8,886,648 B1 * | 11/2014 | Procopio | G06F 17/30663 |
| | | | 707/737 |
| 2002/0103809 A1 * | 8/2002 | Starzl | G06F 17/30864 |
| 2005/0226511 A1 * | 10/2005 | Short | G06K 9/6253 |
| | | | 382/225 |
| 2006/0156220 A1 | 7/2006 | Dreystadt et al. | |
| 2011/0040787 A1 * | 2/2011 | Cierniak | G06F 17/30864 |
| | | | 707/770 |
| 2011/0087669 A1 * | 4/2011 | Ancin | G06F 17/30628 |
| | | | 707/740 |
| 2014/0074917 A1 | 3/2014 | Wei et al. | |
| 2014/0122592 A1 | 5/2014 | Houston et al. | |

(Continued)

OTHER PUBLICATIONS

Andersen, Rebekka, "Component Content Management: Shaping the Discourse Through Innovation Dffusion Research and Reciprocity", Technical Communication Quarterly, 20:4 384-411, 2011 http://www.tandfonline.com/doi/pdf/10.1080/10572252.2011.590178.

(Continued)

*Primary Examiner* — Thu Nga Nguyen
(74) *Attorney, Agent, or Firm* — Lowenstein Sandler LLP (57) ABSTRACT

A method relates to receiving, by a processing device, a document comprising a first topic to be imported into a content management system, calculating a first signature of the first topic in view of content associated with the first topic, determining whether the first topic of the document is substantially similar to at least one of a plurality of topics stored in the content management system by comparing the first signature with a respective signature of the plurality of topics stored in the content management system, and in response to a determination that the first topic of the document is not substantially similar to any of the plurality of topics stored in the content management system, adding the first topic and the content associated with the first topic to the content management system.

20 Claims, 5 Drawing Sheets

(56) References Cited

U.S. PATENT DOCUMENTS

2016/0026609 A1* 1/2016 Adams ............... G06F 17/2235
715/205

OTHER PUBLICATIONS

Trippe, Bill, "Component Content Management in Practice", White Paper, The Gillbane Group, Mar. 2008, 19 Pages http://gilbane.com/whitepapers/EMC/EMC-Component-Content-Management-4-08.pdf.
"Now Content King With a DITA CMS to Manage Its Complex Enterprise Software Suite", IXIASOFT DITA CMS Case Study, IXIASOFT Technologies Inc., 2014, 4 Pages http://www.ixiasoft.com/en/products/dita-cms/resources/sybase/.
"Vasont Content Management System: Perpetual Component Content Management for Critical Business Information", Vasont Systems, vasont.com, 2 Pages https://www.vasont.com/software/vasont-cms.html (Last accessed Oct. 9, 2014).
"Jaccard Index", Wikipedia.org, 4 Pages http://en.wikipedia.org/wiki/Jaccard_index (Last accessed Oct. 9, 2014).
"MinHash", Wikipedia.org, 7 pages http://en.wikipedia.org/wiki/MinHash (Last modified Jul. 20, 2014).

* cited by examiner

REUSE OF DOCUMENTATION COMPONENTS WHEN MIGRATING INTO A CONTENT MANAGEMENT SYSTEM

TECHNICAL FIELD

This disclosure relates to managing documentation in a database and, in particular, to importing documents into a component content management system (CCMS).

BACKGROUND

Products and services are commonly associated with certain online documentation that allows a user to learn how to use the products and services. For example, the package of a software application release commonly includes a detailed online manual to describe how to use the software application. These documents may be stored in a content management system which is a database from which content may be retrieved. One form of the content management system is a linear document where the content of the document is organized sequentially according to an ordered list of topics (e.g., headings) each of which may be associated with textual content that provides detailed information about the topic. Further, certain elements (such as words, phrases, or graphic symbols) of the content for the topic may be hypertexts that each denote an outgoing relation to another topic that can be described by the content (e.g., texts or images) associated with the other topic.

Since the linear document presents its content sequentially according to headings as a single document, the linear document is updated as a whole. Another form of content management system is the component content management system. Compared to the linear document, a component content management system (CCMS) manages the content at a much finer granular level (or component level) than the document level of the linear document. Each component may represent a single topic, concept, or asset (such as an image, table, product, or procedure) that may be updated independently from other components. Each component may further include blocks of content each including elements such as words, phrases, and images that may be changed after an update. Thus, each component may be associated with a specific version of the component, rather than associated with a version of the document. Further, each component may include one or more outgoing relationships linking to other components in the document. For example, a topic may include hyperlinks (in the form of hypertexts) that are linked to other topics that may further illustrate the topic. Therefore, a CCMS may track not only versions of individual components, but also the relationships among components within the CCMS. In this way, a CCMS document may be generated from components that may be easily updated and reused by other CCMS documents.

While CCMS documents may present certain advantages over linear documents, there are a large amount of legacy linear documents existing outside the CCMS that need to be imported into the CCMS. These legacy linear documents may contain topics that duplicate the topics already in the CCMS. Therefore, these legacy linear documents need to be imported into the CCMS in a way that avoids the duplicating content.

BRIEF DESCRIPTION OF THE DRAWINGS

The present disclosure is illustrated by way of example, and not by way of limitation, in the figures of the accompanying drawings.

DETAILED DESCRIPTION

Implementations of the present disclosure relate to receiving, by a processing device, a document comprising a first topic to be imported into a content management system, calculating a first signature of the first topic in view of content associated with the first topic, determining whether the first topic of the document is substantially similar to at least one of a plurality of topics stored in the content management system by comparing the first signature with a respective signature of the plurality of topics stored in the content management system, and in response to a determination that the first topic of the document is not substantially similar to any of the plurality of topics stored in the content management system, adding the first topic and the content associated with the first topic to the content management system.

Implementations of the present disclosure relate to a system including a memory and a processing device to receive a document comprising a first topic to be imported into a content management system, calculate a first signature of the first topic in view of content associated with the first topic, determine whether the first topic of the document is substantially similar to at least one of a plurality of topics stored in the content management system by comparing the first signature with a respective signature of the plurality of topics stored in the content management system, and in response to a determination that the first topic of the document is not substantially similar to any of the plurality of topics stored in the content management system, add the first topic and the content associated with the first topic to the content management system.

Implementations of the present disclosure may include a content management system such as a component content management system (CCMS) that may store multiple content components or topics. Each topic may be associated with a block of content stored in the CCMS, where the block of content may include textual description of the topic. A processing device may be coupled to the CCMS to calculate a respective signature for each of the topics in the CCMS using a hash function and store the signatures in one or more records. In addition to the signature, a topic in the CCMS may be associated with one or more outgoing relationships that link the topic to other topics in the CCMS. Further, the processing device may receive a document external to the CCMS to be imported into the CCMS. The document may include a set of topics each of which may be associated with a block of content in the document. The processing device may calculate a respective signature for each topic in the document and identify outgoing relationships for each topic in the document. The processing device may determine whether a topic in the document is a duplicate of a topic in the CCMS in view of a match between the signatures and the outgoing relationships.

Figure 1:
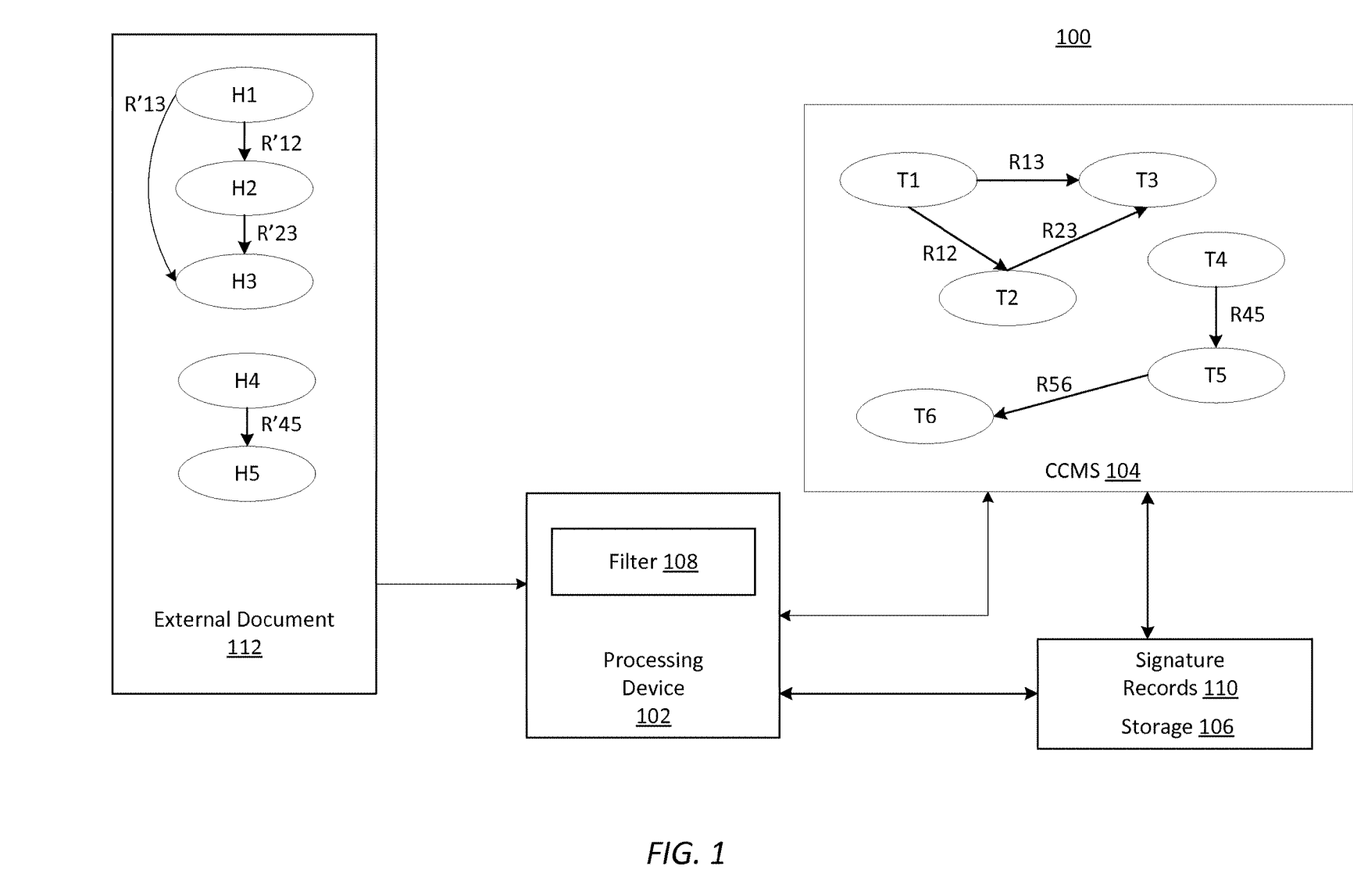
FIG. 1 illustrates a system 100 to import documents into a component content management system (CCMS) according to an implementation of the present disclosure.

FIG. 1 illustrates a system 100 to import documents into a component content management system (CCMS) according to an implementation of the present disclosure. As shown in FIG. 1, the system 100 may include a processing device 102, a component content management system (CCMS) 104, and storage device 106. The processing device 102 may be a processing core or central processing unit (CPU) of a computing device. The CCMS 104 is a content management system (such as a database) that manages content at the component level rather than at the document level. The storage device 106 may be a suitable storage (such as a hard drive or a memory) that may store records of attributes associated with the content stored in the CCMS 104. In one implementation, the processing device 102 and the storage device 106 are external devices that are communicatively coupled to the CCMS 104. In another implementation, the processing device 102 and the storage device 106 are part of the CCMS 104.

In one implementation, the processing device 102 may include a filter 108 which may be a software application that, when executed, may filter the content of an external document 112 to be imported into the CCMS 104. The filter 108 is to identify topics in the external document 112 and determine whether a topic in the external document is a duplicate of any topic already stored in the CCMS 104.

In one implementation, the CCMS 104 may include a database for storing content of the CCMS 104. The content may include a set of records, each record including a topic title and a block of content associated with the topic title. Further, each record may include one or more hyperlinks indicating outgoing relationships with other topics in the CCMS 104. Each topic, the associated content and the outgoing relationships may be managed, updated, and modified individually. Therefore, rather than the CCMS including its components is associated with one version, each component of the CCMS may be associated with an individual version.

In one implementation, as illustrated in FIG. 1, the CCMS 104 may contain topics T1-T6 that each may be associated with a respective block of content. The topics and the associated content constitute part of the CCMS 104. For example, the topic T1 may have a topic title of "Download an Operating System 2.0" which is associated with a block of text that describe where and how to download the operating system 2.0. The topic T2 may have a topic title of "Installation of Operating System 2.0" which is associated with a block of text that describes how to install the operating system 2.0. Topic T3 may have a topic title of "FAQS for Installation of Operating System 2.0" which is associated with a block of text that includes frequently asked questions and corresponding answers relating to the installation of the operating system 2.0.

Figure 2A:
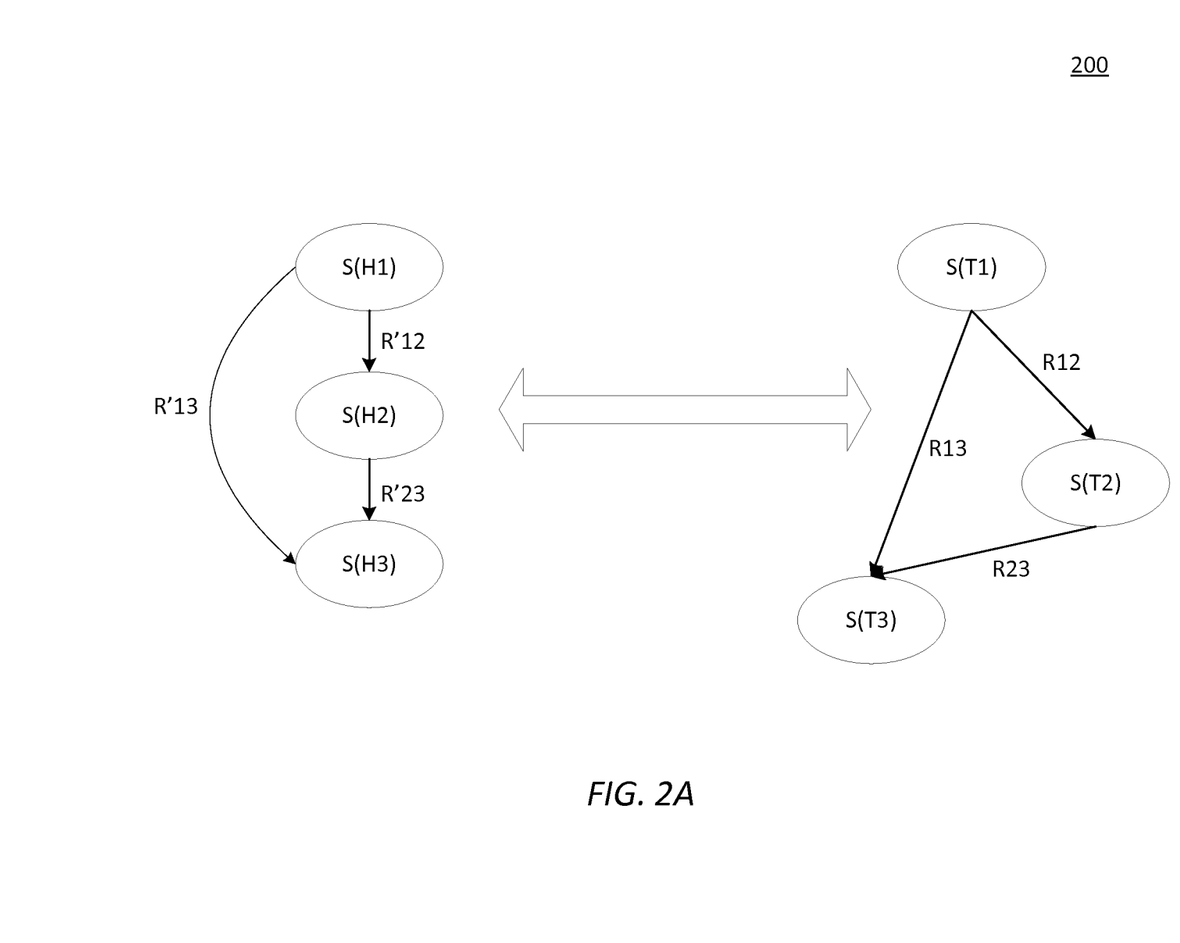
FIG. 2A illustrates an exemplary match between topics in an external document and topics in the CCMS according to an implementation of the present disclosure.

The content associated with topics T1-T3 may include outgoing relationships such as hyperlinks. For example, as shown in FIG. 2A, the content of topic T1 includes the outgoing relationships R12, R13, and the content of topic T2 includes the outgoing relationship R23. The content of the topic T3 does not include an outgoing relationship. In an implementation, an outgoing relationship of a first topic may be a hyperlink embedded in the content associated with the first topic, linking to a second topic. For example, the content of the topic T1 may include the word "installation" embedded with a hyperlink linked to the topic T2, and therefore, topics T1 and T2 are related by an outgoing relationship R12. Similarly, topics T4-T6 in the CCMS 104 may be independent from the topics T1-T3, but may be related by outgoing relationships R45, R56. In one implementation, an outgoing relationship from a first topic to a second topic may be represented by the pair of topics. For example, an outgoing relationship of R12 may be represented as (T1, T2), indicating an outgoing relationship associated with topic T1 to topic T2. Therefore, a first outgoing relationship connecting a first topic to a second topic matches a second outgoing relationship connecting a third topic to a fourth topic if the third topic duplicates or is substantially similar to the first topic and the fourth topic duplicates or is substantially similar to the second topic.

An external document 112 may need to be imported into the CCMS 104. The document 112 may be in a non-CCMS format (such as a linear document). Alternatively, the document 112 may be a CCMS document that needs to be merged into CCMS 104. As illustrated in FIG. 1, the external document 112 may include a set of topics H1-H5. Similarly, each of the topics H1-H5 may be associated with a topic title and a block of content. For example, the external document may be a manual for operating system 3.0 to be imported into the CCMS 104. Since operating system 3.0 is an update built on the operating system 2.0 that is already in the CCMS 104, the content of operating system 3.0 may include topics that are duplicates of one or more of the topics T1-T6. Therefore, it is desirable to identify the duplicate topics in the external document 112, and exclude the duplicate topics from the CCMS 104.

A first topic is a duplicate of a second topic if the content and outgoing relationships associated with the first topic match those of the second topic. In one implementation, a match is identified if there is an identical match between the two topics. However, it is computationally expensive to determine whether the two topics include identically matching content. Moreover, it may be desirable to exclude a topic in the external document 112 whose content is substantially similar to a topic in the CCMS 104 although it is not an identical match.

Implementations of the present disclosure may use locality-sensitive hashing to determine whether topics in the external document 112 have duplicates in the CCMS 104. In one implementation, the processing device 102 may execute the filter 108 to calculate a respective signature S for each topic in the CCMS 104 using a hash function h. The hash function h may define a random permutation on N content elements associated with the topic, where N is an integer number. In one implementation, the content elements may be words contained in the content, and N is an integer larger than 200. In one implementation, the hash function h may generate hash values for a subset of the N content elements. A signature of the topic may be defined as the subset of the k members of the N content elements that have the smallest hash values. In this way, the processing device may calculate a signature for each topic in the CCMS 104. Moreover, the processing device 102 may also identify the outgoing relationships between topics in the CCMS 104 by examining the hyperlinks embedded in the content associated with each topic. Therefore, the processing device 102 may associate each topic in the CCMS 104 with a signature record 110 and store the record in the storage device. The signature record may include a signature of the topic calculated from the content associated with the topic and outgoing relationships of the topic.

The external document 112 may be similarly processed by the filter 108 of the processing device 102 to extract signatures and outgoing relationships for topics contained in the external document 112. In the event that the external document 112 is a CCMS document that needs to merge with a document in CCMS 104, the processing device 102 may calculate signatures and identify outgoing relationships for the topics of the external CCMS document 112. However, if the external document 112 is a linear document that contains a list of headings (such as headings H1-H5), the processing device 102 may assign each heading as a topic, and calculate signatures and identify outgoing relationships for these topics. The processing device 102 may also store the calculated signatures and outgoing relationships for the external document in the storage device 106 as signature records 110.

The processing device 102 may use the calculated signatures and identified outgoing relationships contained in the signature records 110 to determine whether a topic in the external document 112 is a duplicate (or substantially similar) to a topic in the CCMS 104. For convenience of discussion, both duplicate and substantially similar topics are referred to as duplicate topics hereinafter. In one implementation, a topic in the external document 112 is a duplicate of a topic in the CCMS if the content of both topics is highly similar and the outgoing relationships emitted from both topics are identical.

According to an implementation, the similarity between two topics may be calculated from the signatures of the two topics. FIG. 2A illustrates an exemplary match between topics in an external document and topics in the CCMS according to an implementation of the present disclosure. As illustrated in FIG. 2A, each of topics H1-H3 in an external document may be associated with a respective calculated signature S(H1)-S(H3). Similarly, each of topics T1-T3 in the CCMS may be associated with a respective signature S(T1)-S(T3). The similarity between two topics may be calculated from their respective signatures. For example, the similarity between T1 and H1 may be represented as $$J_{T1,H1} = \frac{S(T1) \cap S(H1)}{S(T1) \cup S(H1)},$$

where $\cap$ is the interception operator and $\cup$ is the union operator. Thus, if the two signatures S(T1) and S(H1) are disjointed, $J_{T1, H1}$ is zero. However, if the two signatures S(T1) and S(H1) are identical, $J_{T1, H1}$ is one. Therefore, $J_{T1, H1}$ may be an estimator of the similarity between topics T1 and H1. The two signatures are more similar if $J_{T1, H1}$ is closer to one. In one implementation, a threshold TH in the range of zero to one may be selected so that when the similarity J is equal to or is greater than the threshold TH, the two topics are considered to include content that is nearly the same or substantially similar.

To determine whether two topics are the same or substantially similar, the outgoing relationships emitted from these two topics need to be identical. Referring to FIG. 2A, if the similarities between T1 and H1, T2 and H2, and T3 and H3 are all above the similarity threshold value TH, the contents between T1 and H1, T2 and H2, and T3 and H3 are considered nearly the same. Then, the outgoing relationships, if any, emitted from T1 and H1 may be compared to determine if the outgoing relationships also match. As shown in FIG. 2A, topic T1 in the CCMS may be identified as having an outgoing relationship R12 with topic T2, and an outgoing relationship R13 with topic T3. Further, topic T2 may be identified to have an outgoing relationship R23 to topic T3. Correspondingly, topic H1 in the external document may be identified as having an outgoing relationship R'12 with topic H2, and an outgoing relationship R'13 with topic H3. Further, topic H2 may be identified with an outgoing relationship R'23 with topic H3. Since topics T1 and H1 have nearly the same content and emit identical outgoing relationships (R12, R13, R'12, R'13) and the target topics T2, T3, R2, R3 also have duplicated content and outgoing relationships (R23, R'23), topic H1 may be determined to be a duplicate of topic T1 in the CCMS and should be excluded from importation to the CCMS. In the same manner, topics H2, H3 may be determined to be duplicates of topics T2, T3 in the CCMS.

Figure 2B:
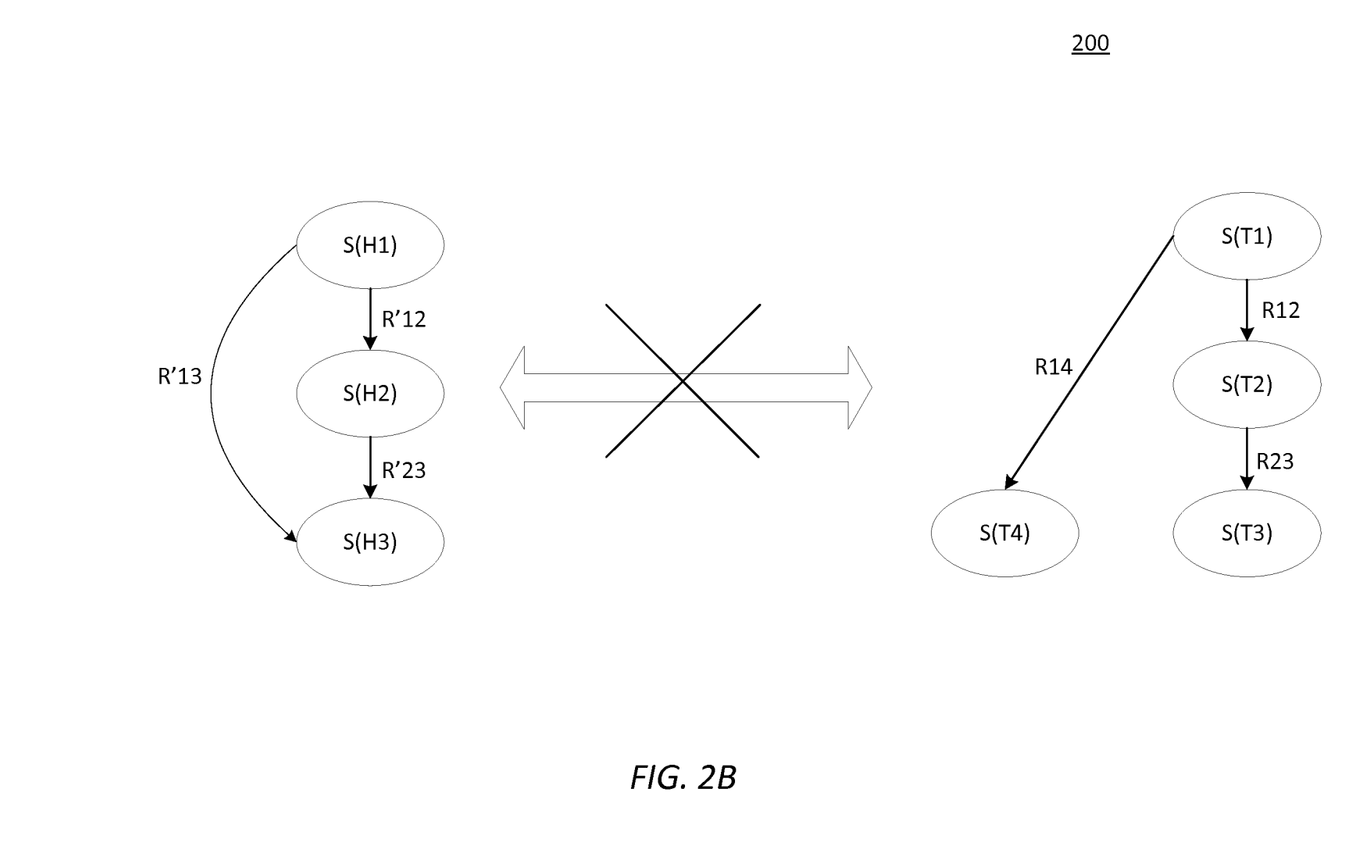
FIG. 2B illustrates an exemplary mismatch between a topic in an external document and a topic in the CCMS according to an implementation of the present disclosure.

If two topics have different outgoing relationships, they are considered as mismatched (or not similar) even if they have duplicate content. FIG. 2B is an example of two topics T1, H1 that are not similar because they have different outgoing relationships (R'13, R14). In one implementation, the filter 108 may determine that the matching topics T1 and H1 have the matching outgoing relationships R12 and R'12, and the matching topics T2 and H2 have the matching outgoing relationships R23 and R'23. Further, the filter 108 may determine that the topic T1 has a second outgoing relationship R14 linked to T4, and the topic H1 has a second outgoing relationship R'13 linked to H3 which is already matched to the topic T3. Therefore, the topics T1, H1 are not similar because their outgoing relationships (R'13, R14) to the target topics T4, H3 are different.

Figure 3:
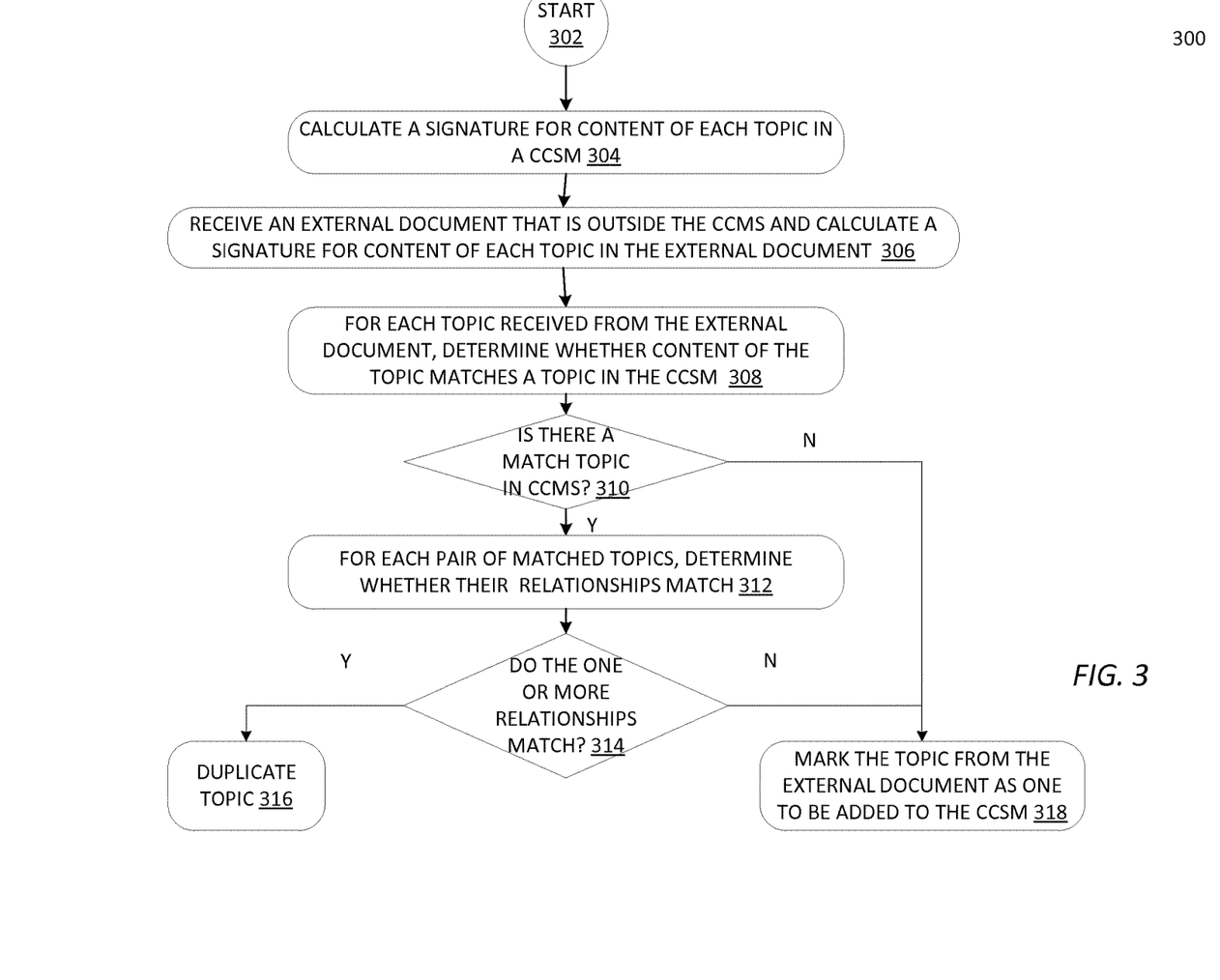
FIG. 3 is a flow diagram illustrating a method 300 to determine duplicate topics in an external document according to an implementation of the disclosure.

FIG. 3 is a flow diagram illustrating a method 300 to determine duplicate topics in an external document according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by the filter subsystem 108 executed on the processing device 102 as shown in FIG. 1.

Referring to FIG. 3, at 302, the processing logic may start the operations to determine whether a topic in an external document is a duplicate of a topic in a CCMS. The CCMS may contain a first set of topics each of which may be associated with a block of content and outgoing relationships with other topics. At 304, the processing logic may calculate a respective signature for the content of each topic stored in a CCMS using a hash function h. The hash function h may define a random permutation on N (a natural number) content elements associated with the topic. The processing logic may calculate hash values for a subset of the N content elements. The signature of a topic is then the subset of the k members of the N content elements that have the smallest hash values, where k is less than N.

At 306, the processing logic may receive an external document that is to be imported into the CCMS. The external document may include a second set of topics each of which may be associated with a block of content and outgoing relationships with other topics in the external document. Similarly, the processing logic may calculate a respective signature for the content of each topic contained in the external document using the hash function h.

At 308, the processing logic may determine whether the content associated with a topic contained in the external document is similar to any topic in the CCMS in view of a similarity measurement calculated from the signatures associated with the topics in the CCMS and in the external document. The similarities may be compared with a threshold value in the range of zero to one. If the processing logic determines that the topic in the external document does not have a topic in the CCMS with similar content, at 310, the processing logic may determine the topic in the external document should be added to the CCMS, and at 318, add the topic from the external document to the CCMS. In an implementation, instead of adding to the CCMS, the topic from the external document may be marked as one to be added in the CCMS. For example, the processing logic may mark the topic with an identifier as a candidate to be added to the CCMS. The processing logic may add the all topics that are marked as to be added to the CCMS after all topics in the external document have been processed. However, if the processing device determines that there is a topic in the CCMS that has content similar to the topic in the external document, at 310, the processing logic may further need to determine whether the outgoing relationships embedded in the topics match.

At 312, the processing logic may first determine whether the total number of outgoing relationships embedded in the content associated with the topic contained in the external document is the same as the total number of outgoing relationships (such as hyperlinks) in the matching topic in the CCMS. If the numbers are the same, the processing logic may determine that each outgoing relationship in the topic of the external document has a matching outgoing relationship in the matching topic in the CCMS. In one implementation, the processing device may determine the match of outgoing relationships in view of the origin and destination of each outgoing relationship. Namely, two outgoing relationships match if their respective origins and destinations are matching topics.

In an implementation, the determination of whether two topics have the same outgoing relationships may include the steps of recursively checking not only the content of the destination topic linked to by each outgoing relationships but also the outgoing relationships contained in the content of the destination (or target) topic. If the destination topic has different outgoing relationships, the two topics are considered not to be similar.

If all outgoing relationships embedded in the topic of the external document match with those embedded in the matching topic in the CCMS, at 314, the processing device may determine that the topic in the external document is a duplicate topic. At 316, the processing logic may mark the topic with a marker indicating not to be added into the CCMS and exclude the topic in the external document from being imported into the CCMS. However, if any outgoing relationship embedded in the topic in the external document cannot find a match to outgoing relationships embedded in the matching topic in the CCMS, at 314, the processing logic may determine that the topic in the external document is a new to the CCMS, and at 318, add the topic in the external document to the CCMS or mark as one to be added to the CCMS. In this way, duplicate topics from external documents may be excluded from being imported into a CCMS.

Figure 4:
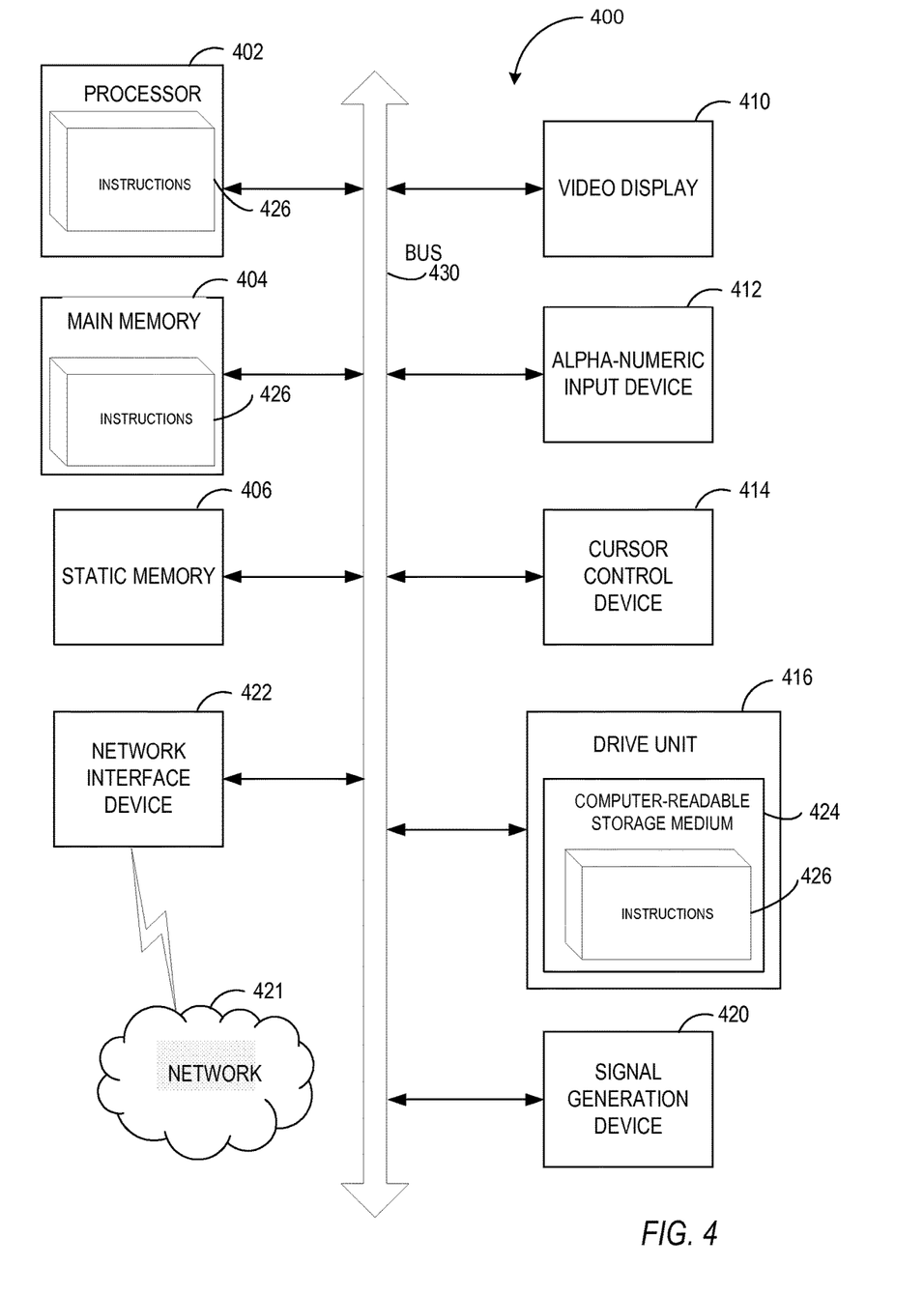
FIG. 4 is a block diagram illustrating an exemplary computer system, according to an implementation of the disclosure.

FIG. 4 illustrates a diagrammatic representation of a machine in the exemplary form of a computer system 400 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein. The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 722.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device, a document comprising a first topic to be imported into a content management system;
   calculating a first signature of the first topic in view of content associated with the first topic;
   determining, by comparing the first signature with a respective signature for each of the plurality of topics stored in the content management system, whether the first topic of the document is a match to at least one of a plurality of topics stored in the content management system; and
   in response to a determination that the first topic of the document is the match to the at least one topic stored in the content management system:
   identifying a plurality of hyperlinks embedded in the content associated with the first topic;
   determining whether at least one of the plurality of hyperlinks embedded in the content associated with the first topic matches any hyperlink associated with the at least one topic stored in the content management system to confirm whether the first topic of the document is a match to the at least one topic stored in the content management system; and
   in response to determining that the at least one of the plurality of hyperlinks embedded in the content associated with the first topic does not match any hyperlink associated with the at least one topic stored in the content management system:
   confirming that the first topic of the document is not a match; and
   adding the first topic and the content associated with the first topic to the content management system.

2. The method of claim 1, further comprising:
in response to a determination that the first topic of the document is not the match to any of the plurality of topics stored in the content management system, adding the first topic and the content associated with the first topic to the content management system; and
in response to the determination that the first topic of the document is the match to the at least one topic stored in the content management system,
determining whether each of the plurality of hyperlinks associated with the first topic matches a corresponding hyperlink associated with the at least one topic stored in the content management system.

3. The method of claim 2, further comprising:
in response to a determination that each of the plurality of hyperlinks embedded in the content associate with the first topic matches a corresponding hyperlink associated with the at least one topic stored in the content management system, refraining from importing the first topic of the document into the content management system.

4. The method of claim 2, wherein a first hyperlink of the plurality of hyperlinks embedded in the content associated with the first topic matches a second hyperlink associated with the at least one topic stored in the content management system if the first hyperlink points to a first target topic of the document that is the match to a second target topic stored in the content management system.

5. The method of claim 1, wherein the content management system is a component content management system (CCMS).

6. The method of claim 1, wherein the received document is one of a linear document or a component content management system (CCMS) document.

7. The method of claim 1, wherein calculating the first signature comprises:
calculating a plurality of hash values in view of a hash function for a plurality of subsets of the content associated with the first topic stored in the content management system;
determining a first subset of the plurality of subsets whose hash value is a minimum among the plurality of hash values; and
assigning the first subset of the content as the signature of the first topic.

8. The method of claim 1, wherein determining whether the first topic of the document is the match to the at least one of a plurality of topics stored in the content management system further comprises:
calculating a similarity between the first signature and the at least one signature of the topics stored in the content management system; and
comparing the similarity with a predetermined threshold.

9. A non-transitory machine-readable storage medium storing instructions which, when executed, cause a processing device to:
receive, by a processing device, a document comprising a first topic to be imported into a content management system;
calculate a first signature of the first topic in view of content associated with the first topic;
determine, by comparing the first signature with a respective signature of the plurality of topics stored in the content management system, whether the first topic of the document is a match to at least one of a plurality of topics stored in the content management system; and in response to a determination that the first topic of the document is the match to the at least one topic stored in the content management system:
identify a plurality of hyperlinks embedded in the content associated with the first topic;
determine whether at least one of the plurality of hyperlinks embedded in the content associated with the first topic matches any hyperlink associated with the at least one topic stored in the content management system to confirm whether the first topic of the document is a match to the at least one topic stored in the content management system; and
in response to determining that the at least one of the plurality of hyperlinks embedded in the content associated with the first topic does not match any hyperlink associated with the at least one topic stored in the content management system:
confirm that the first topic of the document is not a match; and
add the first topic and the content associated with the first topic to the content management system.

10. The machine-readable storage medium of claim 9, wherein the processing device is further to:
in response to a determination that the first topic of the document is not the match to any of the plurality of topics stored in the content management system, add the first topic and the content associated with the first topic to the content management system; and
in response to the determination that the first topic of the document is the match to the at least one topic stored in the content management system,
determine whether each of the plurality of hyperlinks associated with the first topic matches a corresponding hyperlink embedded in the content associated with the at least one topic stored in the content management system.

11. The machine-readable storage medium of claim 10, wherein the processing device is further to:
in response to a determination that each of the plurality of hyperlinks associate with the first topic matches a corresponding hyperlink associated with the at least one topic stored in the content management system, refrain from importing the first topic of the document into the content management system.

12. The machine-readable storage medium of claim 10, wherein a first hyperlink of the plurality of hyperlinks associated with the first topic matches a second hyperlink associated with the at least one topic stored in the content management system if the first hyperlink points to a first target topic of the document that is the match to a second target topic stored in the content management system.

13. The machine-readable storage medium of claim 9, wherein content management system is a component content management system (CCMS).

14. The machined-readable storage medium of claim 9, wherein the received document is one of a linear document or a component content management system (CCMS) document.

15. The machine-readable storage medium of claim 9, wherein to calculate the first signature, the processing device is further to:
calculate a plurality of hash values in view of a hash function for a plurality of subsets of the content associated with the first topic stored in the content management system;

determine a first subset of the plurality of subsets whose hash value is a minimum among the plurality of hash values; and assign the first subset of the content as the signature of the first topic.

16. The machine-readable storage medium of claim 9, wherein to determine whether the first topic of the document is the match to the at least one of a plurality of topics stored in the content management system, the processing device is further to:

calculate a similarity between the first signature and the at least one signature of the topics stored in the content management system; and compare the similarity with a predetermined threshold.

17. A system, comprising:

a memory; and a processing device communicatively coupled to the memory, to:

receive a document comprising a first topic to be imported into a content management system;

calculate a first signature of the first topic in view of content associated with the first topic;

determine, by comparing the first signature with a respective signature of the plurality of topics stored in the content management system, whether the first topic of the document is a match to at least one of a plurality of topics stored in the content management system; and in response to a determination that the first topic of the document is the match to the at least one topic stored in the content management system:

identify a plurality of hyperlinks embedded in the content associated with the first topic;

determine whether at least one of the plurality of hyperlinks embedded in the content associated with the first topic matches any hyperlink associated with the at least one topic stored in the content management system to confirm whether the first topic of the document is a match to the at least one topic stored in the content management system; and in response to determining that the at least one of the plurality of hyperlinks embedded in the content associated with the first topic does not match any hyperlink associated with the at least one topic stored in the content management system:

confirm that the first topic of the document is not a match; and add the first topic and the content associated with the first topic to the content management system.

18. The system of claim 17, wherein the processing device is further to:

in response to a determination that the first topic of the document is not the match to any of the plurality of topics stored in the content management system, add the first topic and the content associated with the first topic to the content management system; and in response to the determination that the first topic of the document is the match to the at least one topic stored in the content management system, determine whether each of the plurality of hyperlinks associated with the first topic matches a corresponding hyperlink associated with the at least one topic stored in the content management system.

19. The system of claim 18, the processing device is further to:

in response to a determination that each of the plurality of hyperlinks associate with the first topic matches a corresponding hyperlink associated with the at least one topic stored in the content management system, refrain from importing the first topic of the document into the content management system.

20. The system of claim 17, the processing device to determine whether the first topic of the document is the match to the at least one of a plurality of topics stored in the content management system, the processing device is further to:

calculate a similarity between the first signature and the at least one signature of the topics stored in the content management system; and compare the similarity with a predetermined threshold.

* * * * *